(12) United States Patent
Kobari

(10) Patent No.: US 7,216,934 B1
(45) Date of Patent: May 15, 2007

(54) AUTOMOTIVE SEAT WITH INFLATABLE CUSHION DEVICE

(75) Inventor: Manabu Kobari, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/432,370

(22) Filed: May 12, 2006

(51) Int. Cl.
*B60N 2/64* (2006.01)

(52) U.S. Cl. ............................. 297/284.9; 297/284.6; 297/180.14

(58) Field of Classification Search ........... 297/180.13, 297/180.14, 284.6, 284.9, 452.41, 216.13; 280/730.1, 730.2
See application file for complete search history.

(56) References Cited

U.S. PATENT DOCUMENTS

| | | | | |
|---|---|---|---|---|
| 4,444,430 A | * | 4/1984 | Yoshida et al. .......... | 297/284.6 |
| 4,592,588 A | * | 6/1986 | Isono et al. .............. | 297/284.6 |
| 5,005,904 A | * | 4/1991 | Clemens et al. ......... | 297/284.6 |
| 6,129,419 A | * | 10/2000 | Neale ...................... | 297/284.4 |
| 2003/0160479 A1 | * | 8/2003 | Minuth et al. ......... | 297/180.14 |

FOREIGN PATENT DOCUMENTS

JP 08-224137 9/1996

\* cited by examiner

*Primary Examiner*—Peter R. Brown
(74) *Attorney, Agent, or Firm*—Browdy and Neimark, PLLC

(57) ABSTRACT

In a seat back of automotive seat with an inflatable cushion device, an inflatable cushion element and a pair of air supply units are provided as constituent elements of the inflatable cushion device. In particular, a pair of support wire elements are provided to a seat back frame in the seat back so as to supportively receive the two air supply units, respectively. Specifically, those two support wire elements are fixedly connected with respective two upper portions respectively of two lateral frame portions of the seat back frame. Each of the two air supply units is covered with an elastic cover.

3 Claims, 2 Drawing Sheets

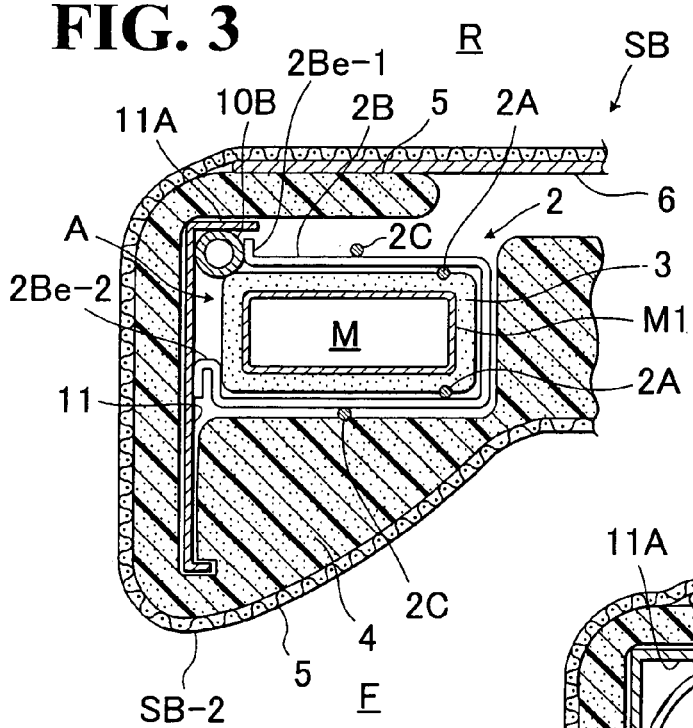
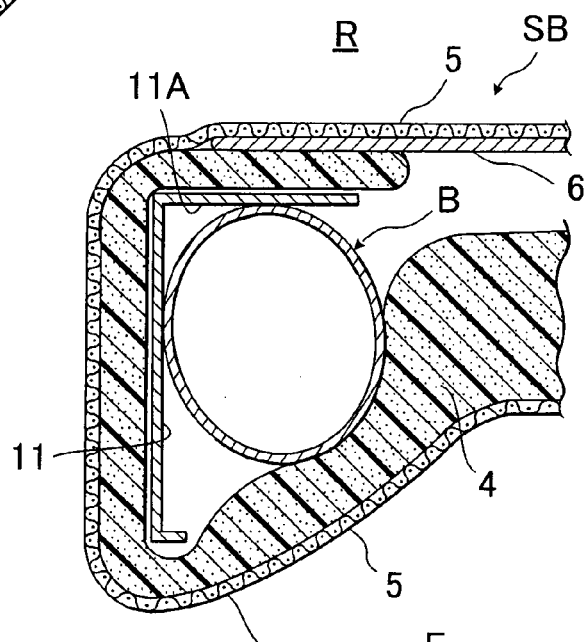
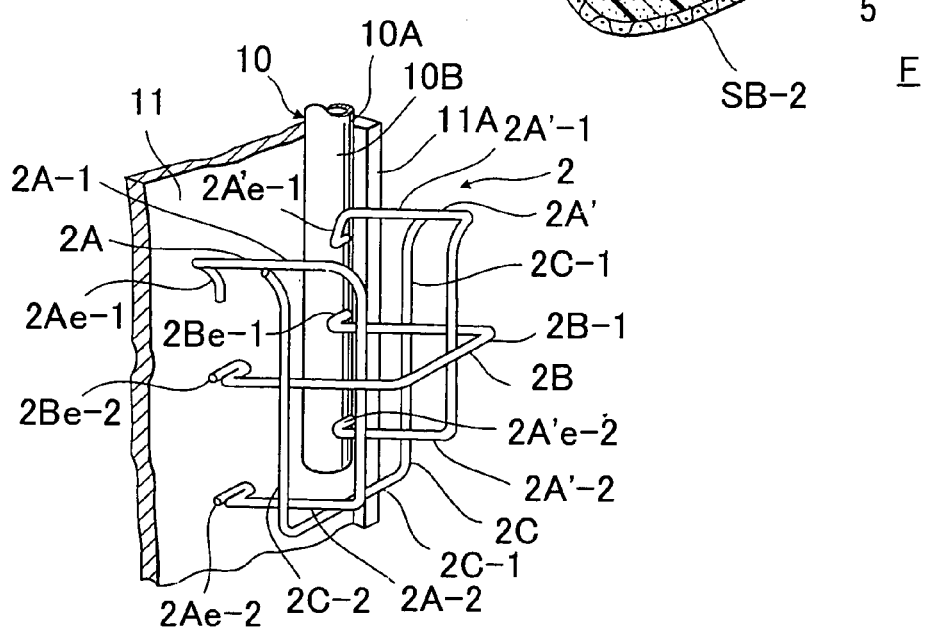

AUTOMOTIVE SEAT WITH INFLATABLE CUSHION DEVICE

BACKGROUND OF THE INVENTION

1. Field of the Invention

The present invention relates to an automotive seat having an built-in inflatable cushion (or air cushion) device wherein some inflatable cushion elements are provided in required local areas of the seat for improved cushion purpose and controllable as to their respective inflation amounts by means of associated control elements.

2. Description of Prior Art

There are various sorts of automotive seats that allows for adjustment of its cushioning condition to alleviate fatigue and pains caused in a seat occupant's buttocks portion, waist portion and back portion due to a long period of time of his or her seating on the seat.

Of these kinds of seats, there has been known an automotive seat of air cushion type wherein inflatable cushion elements (normally, bag-like inflatable cushion elements) are arranged in a predetermined manner and can each be controlled as to its inflation and deflation by associated control elements so as to adjustably provide an optimum cushion effect to the desired body portions of seat occupant. In general, in such type of seat, an inflatable cushion element is disposed in each of local areas of seat corresponding to each of the seat occupant's buttocks and lateral side portions, and an air supply/suction means is operatively connected with such inflatable cushion element so as to cause adjustable inflation and deflation of the latter. Such air supply/suction means disposed on a floor r of automobile or other areas of automobile. An example thereof is shown from the Japanese Laid-Open Patent Publication No. 8-224137, according to which, an air pump, an electric motor, a distributor and controllers are provided as one air supply unit which acts as the foregoing air supply/suction means, and such air supply unit is disposed on the floor to avoid vibration of the seat. This is because, if the air supply unit is disposed in the seat, a vibration from the motor and air pump is directly transmitted to a whole of the seat, which will result in making a seat occupant thereon uncomfortable.

However, the foregoing conventional disposition of the air supply unit is found defective in that (i) the air supply unit occupies much of the floor area under the seat and thus such occupied floor area can not be used for other various purposes, and (ii) since the air supply unit is a unit separate from the seat, it is technically difficult and troublesome to properly mount it on the floor or a given part of automobile,

SUMMARY OF THE INVENTION

In view of the above-stated drawbacks, it is a purpose of the present invention to provide an improved automotive seat with inflatable cushion device which prevents transmission of vibration and noise to a seat occupant, while permitting an air supply unit of the inflatable cushion device to be disposed in a seat back of the seat.

In order to achieve such purpose, an automotive seat with an inflatable cushion device in accordance with present invention is basically comprised of:

an inflatable cushion element provided in a seat back;
a pair of air supply units operatively communicated with the inflatable cushion element, such that operation of such pair of air supply units causes supply and suction of an air to and from the inflatable cushion element; and
a pair of support wire elements, each being so formed by wire as to have a configuration to receive and support each of the pair of air supply unit, and provided in an upper portion of the seat back so as to be disposed symmetrically in relation to a center of the seat back,
wherein the foregoing pair of air supply units are respectively supported in the foregoing pair of support wire elements.

Preferably, the afore-said pair of support wire elements may each comprise a wire support basket element which is formed by a plurality of wires in a basket-like configuration.

Preferably, such two support wire elements may be fixedly connected with the respective two upper portions respectively of a pair of lateral frame positions of a seat back frame provided in the seat back, such that the two support wire elements are disposed symmetrically in relation to a center of the seat back, and the foregoing pair of air supply units may each be covered with an elastic cover, so that thus-covered two air supply units are supported in the respective two support wire elements.

Other features and advantages of the present invention will become apparent from reading of the descriptions hereinafter, with reference to the annexed drawings.

BRIEF DESCRIPTION OF THE DRAWINGS

FIG. 3 is a sectional view taken along the line III—III in FIG. 1;

FIG. 4 is a sectional view taken along the line IV—IV in FIG. 1; and

FIG. 5 is a partly broken schematic perspective view of a support element in the automotive seat with inflatable cushion device of the present invention.

DETAILED DESCRIPTION OF PREFERRED EMBODIMENT OF THE INVENTION

Referring to FIGS. 1 to 5, there is illustrated a preferred embodiment of an automotive seat with inflatable cushion system, as generally designated by (S), in accordance with the present invention.

Figure 1:
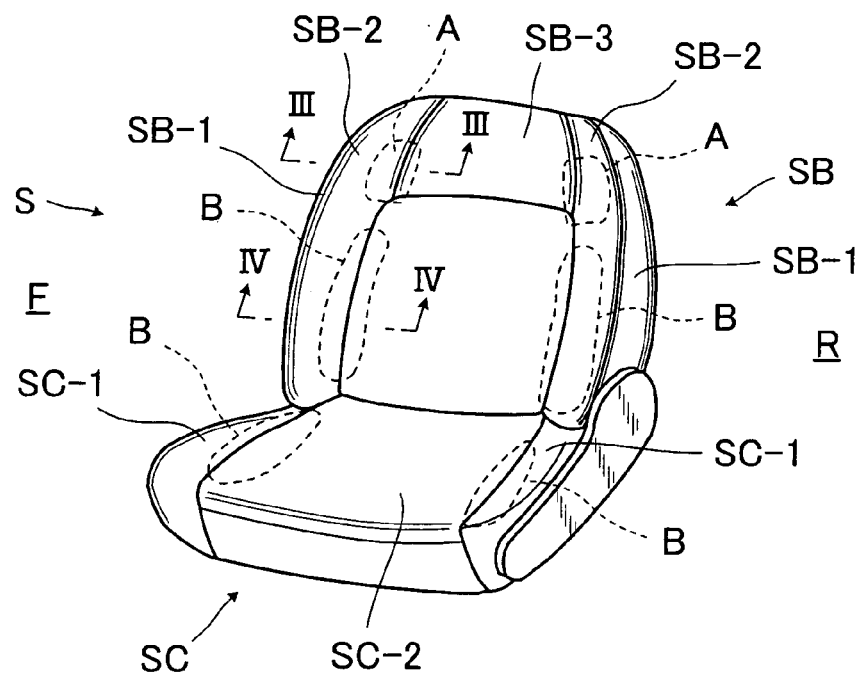
FIG. 1 is a schematic perspective view of an automotive seat with inflatable cushion device in accordance with the present invention.

As shown in FIG. 1, the automotive seat (S) is basically comprised of; a seat cushion (SC); a seat back (SB); and an inflatable cushion system (A).

Designation (SB-1) denotes a protuberant bolster side portion of the seat back (SB), and designation (SC-1) denotes a protuberant bolster side portion of the seat back (SB). As is known, the seat back bolster side portion (SB-1) is configured to support one lateral side of a seat occupant's upper body portion, whereas the seat cushion bolster side portion (SC-1) configured to support one lateral side of the seat occupant's buttocks and thigh portions.

As indicated by the chain lines in FIG. 1, a plurality of inflatable cushion elements (B) are provided as one part of the inflatable cushion system (A) in the automotive seat (S). Each inflatable cushion element (B) is formed from an elastic expandable material such as rubber. As shown in FIG. 1, two inflatable cushion elements (B) are provided within the seat back (SB) so as to be disposed beneath the respective two seat back bolster side portions (SB-1) (SB-1). Likewise, another two inflatable cushion elements (B) are provided within the seat cushion (SC) so as to be disposed beneath the respective two seat cushion bolster side portions (SC-1) (SC-1). In brief, inflation and deflation of each inflatable cushion element (B) will give a comfortable support touch or a certain massage effect to both lateral side portions of seat occupant's upper body portion as well as of seat occupant's buttocks and thigh portions.

It is noted that the term "forward" or "forwardly" refers to a side (F) forwardly of the automotive seat, and the term "backward" or "backwardly" refers to a side (R) backwardly of the seat.

For the sake of simplicity in description, a specific description will be made only of the seat back (SB) and it associated parts of the inflatable cushion system (A).

Figure 2:
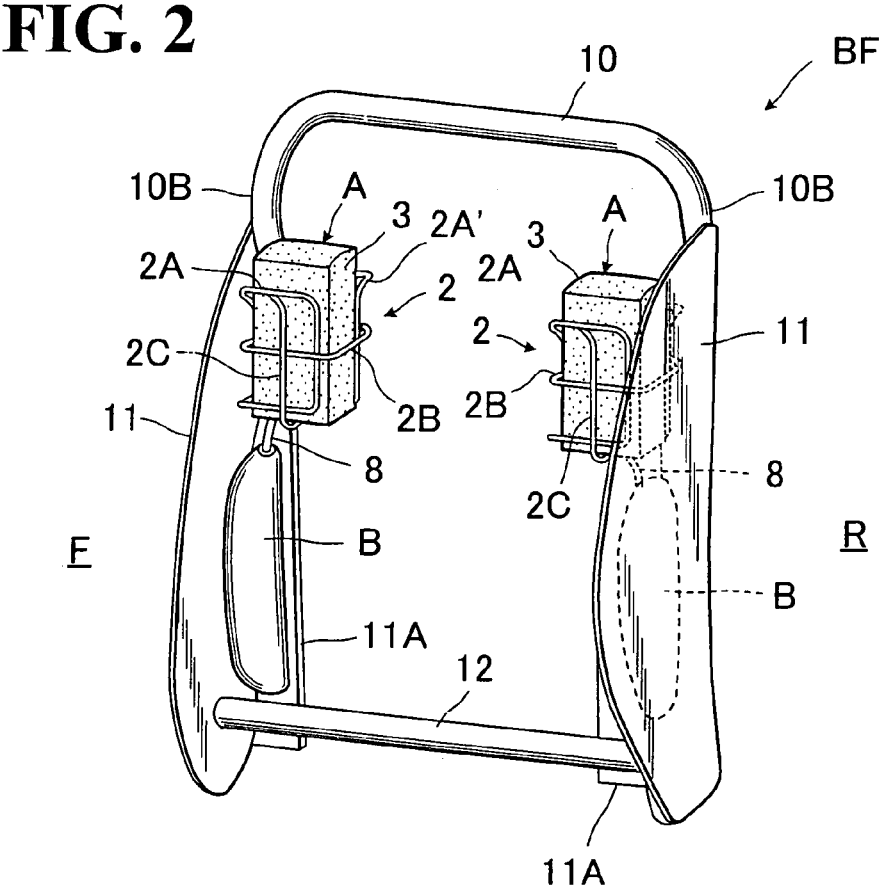
FIG. 2 is a schematic perspective view of a seat back frame and a principal part of the present invention provided in the seat back frame.

FIG. 2 illustrates a known seat back framework (BF) provided in the seat back (SB), which typically comprises: an upper frame member (10); a pair of lateral plate frame members (11) (11); and a lower tubular frame member (12).

The upper frame member (10) is of a generally inverted U shape having a pair of downwardly extending lateral frame portions (10B) (10B). Each of the two lateral frame members (11) (11) is formed from a rigid plate material and includes a cross plate frame portion (11A) which is defined in the backward side of the lateral frame member (11) by bending the corresponding local region of the latter by a right angle as illustrated. Thus, a corner is defined between the lateral frame member (11) and the cross plate frame portion (10A). Firmly welded to such corner is each of the afore-said two downwardly extending lateral frame portions (10B), as can be seen from FIGS. 2, 3 and 5. As seen in FIG. 2, two ends of the lower frame member (12) are fixedly connected with the respective two lower end portions of the two lateral frame members (11).

In accordance with the present embodiment, a pair of the foregoing inflatable cushion systems (A) and (A) are provided to an upper region of the above-described known seat back framework (BF). Each inflatable cushion system (A) is basically comprised of: a known air supply control unit (M); a known inflatable cushion element (B) communicated via a pipe (8) with the air supply control unit (M); a basket-like support element (2) for receiving and supporting the air supply control unit (M) therein; and a three-dimensional elastic cover (3) for substantially covering an entirety of the air supply control unit (M).

Specifically, the inflatable cushion element (B) is formed by an elastic material in the shown shape similar to an air bag, for example, and is securely attached to the afore-said corner defined between the lateral plate frame member (11) and cross plate frame portion (11A), as seen from FIGS. 2 and 4. As is known, the air supply control unit (M) is in communication with that inflatable cushion element (B) via the pipe (8), and is also electrically connected with a remote switch element (not shown). While not shown, the air supply control unit (M) comprises a motor, an air pump, a distributor, a control circuit and so forth, which are collectively and properly provided in the cubic casing (M1) thereof, with such an arrangement that operation of the remote switch element causes normal and reverse operation of the motor and air pump under electronic control of the control circuit so as to supply and suction air through the distributor and pipe (8) to and from the inflatable cushion element (B), thereby adjustably inflating and deflating that particular cushion element (B). Since this is well known in the art and not the subject matter of the present invention. Any further specific description and illustration thereof is omitted.

In accordance with the present invention, as understandable from FIGS. 2 and 3, the entire outer surfaces of the cubic casing (M1) of the air supply control unit (M) are substantially covered with the afore-said cubic or three-dimensional elastic cover (3), excepting the connection portion of the casing (M) to which the pipe (8) is connected.

Also, in accordance with the invention, the afore-said support element (2) may be formed in a basket shape by a plurality of wires so as to supportively receive the foregoing air supply control unit (M) covered with the elastic cover (3).

Specifically, as best shown in FIG. 5, the support element (2) may be formed by four generally U-shaped wire members (2A), (2A'), (2B) and (2C). Namely, there are provided a pair of spaced-apart forwardly and backwardly facing wire members (2A) (2A'), which can each be basically described as generally "U" shape, although it is of a generally "⊐" shape which is however defined by simply laying the generally "U" shape of wire member (2A or 2A') on its side and thus falls in the category of generally "U" configuration. Also, provided are a generally U-shaped cross wire member (2B); and a generally U-shaped vertical wire member (2C).

The forwardly facing wire member (2A) is fixed at the two ends (2Ae-1) (2Ae-2) thereof to the inward wall of the lateral plate frame member (11), whereas the backwardly facing wire member (2A') is fixed at the two ends (2A'e-1) (2A'e-2) thereof to the lower end region of one lateral frame portion (10A) associated with the upper frame member (10). As viewed from FIG. 2 in conjunction with FIG. 5, those two wire members (2A) (2A') are adapted to support the forwardly and backwardly facing surfaces of the elastic cover (3) (or the corresponding two sides of the air supply control unit (M)), respectively. The cross wire member (2B) is fixed at one end (2Be-1) thereof to the lower end region of such lateral frame portion (10A), while being fixed at another end (2Be-2) thereof to the inward wall of the lateral plate frame member (11) in such a manner as to straddle across both forward and backward wire members (2A) (2A'). As also viewed from FIG. 2 in conjunction with FIG. 5, the cross wire member (2B) has a cross support region (2B-1) facing inwardly of the seat back frame (SB) on the right side, wherein the cross support region (2B-1) is adapted to support the inwardly facing or right-side surface of the elastic cover (3) (or the corresponding side of the air supply control unit (M)), The vertical wire member (2C) has a lower cross support region (2C-1) and a pair of first and second vertical securing regions (2C-1) (2C-2). As shown in FIG. 5, the first vertical securing region (2C-1) is fixed to both upper and lower wire sections (2A-1) (2A-2) of the forwardly facing wire member (2A), while the second vertical securing region (2C-2) is fixed to both upper and lower wire sections (2A'-1) (2A'-2) of the backwardly facing wire member (2A'). As can be seen from FIG. 2 in conjunction with FIG. 5, the lower cross support region (2C-1) is adapted to support a lower or bottom surface of the elastic cover (3).

As seen in FIG. 2, the air control unit (M) covered with the elastic cover (3) is inserted and received in the basket-like wire support element (2) at the upper portion of the seat back frame (BF).

It is to be understood that the above description applies to both two inflatable cushion systems (A) and (A).

Accordingly, the automotive seat with inflatable cushion system in accordance with the present invention has the following advantages and effects:

(i) Since the entirely of air control unit (M) is substantially covered with the elastic cover (3), most of noise and vibration generated from the air control unit (M) is absorbed by that elastic cover (3).

(ii) Further, the thus-covered air control unit (M) is accommodated in the support element (2) which is fabricated by only four wires (2A), (2A'), (2B) and (2C) in a substantially grid manner, and the support element (2) is connected to the side of lateral frame member (11) at only six points (at 2Ae-1, 2Be-2, 2Ae-2, 2A'e-1, 2Be-1, and 2A'e-2). Thus, even a certain amount of the vibration and noise imparted through the elastic cover (3) from the air control unit (M) is completely dispersed into such grid fabrication of wires as well as into the lateral plate frame member (11), which effectively prevents transmission of the vibration and noise to the seat back (SB). In particular, as show in FIG. 5, the three connecting points (at 2A'-1, 2Be-1, and 2Ae'-2) of the support element (2) are defined on the lower end portion (10B) associated with the seat back frame's upper frame member (10). Such provision of the frame member (at 10B) between the half side of the support element (2) and the lateral plate frame member (11) is effective in completely preventing transmission of the vibration from the air supply control unit (M) to the seat back (SB).

(iii) A pair of the air supply control units (M) (M), which are relatively great in weight, are disposed at the upper portion of the seat back frame (BF). Such arrangement of air supply control units (M) serves to cause a sympathetic vibration on that upper portion of seat back frame (BF) in response to a vibration imparted from a lower side of the seat back frame (BF); the vibration being created by a vehicle (not shown) running on a road, for example, so that such particular vibration from the lower side of seat back frame (BF) is counterbalanced with the sympathetic vibration caused in the upper portion of seat back frame (BF) where the two air supply control units (M) lie. This advantageously prevents transmission of a vibration from the vehicle to a seat occupant on the present automotive seat. In addition thereto, the thus-arranged two air supply control units (M) are spaced apart from each other at a point where they are to embracingly support both two lateral sides respectively of two shoulder portions of a seat occupant, thereby providing a comfortable and stable support touch to the seat occupant.

While having described the present invention, it should be understood that the invention is not limited to the illustrated embodiment, but, any modification, replacement and addition may be applied thereto without departing from the appended claims.

What is claimed is:

1. An automotive seat with an inflatable cushion device, which includes a seat back having an upper portion, comprising:
   an inflatable cushion element provided in said seat back;
   a pair of air supply units operatively communicated with said inflatable cushion element, such that operation of said pair of air supply units causes supply and suction of an air to and from the inflatable cushion element; and
   a pair of wire support basket elements, each being so formed by a plurality of wires as to have a basket configuration to respectively receive and support each one of said pair of air supply unit, and provided in said upper portion of said seat back so as to be disposed symmetrically in relation to a center of the seat back,
   wherein said pair of air supply units are respectively supported in said pair of wire support basket elements.

2. An automotive seat with an inflatable cushion device, which includes a seat back and a seat back frame provided in said seat back, said seat back frame having a pair of lateral frame portions, comprising:
   an inflatable cushion element provided in said seat back;
   a pair of air supply units operatively communicated with said inflatable cushion element, such that operation of said pair of air supply units causes supply and suction of an air to and from the inflatable cushion element; and
   a pair of support wire elements, each being so formed by wire as to have a configuration to receive and support each of said pair of air supply unit;
   said pair of support wire elements being fixedly connected with the respective two upper portions respectively of said pair of lateral frame positions, such that said pair of support wire elements are disposed symmetrically in relation to a center of the seat back;
   an elastic cover; and
   said pair of air supply units being each covered with said elastic cover,
   wherein said pair of thus-covered air supply units are respectively supported in said pair of support wire elements.

3. The automotive seat with inflatable cushion device as claimed in claim 2, wherein said pair of support wire elements each comprises a wire support basket element which is formed by a plurality of wires in a basket-like configuration.

* * * * *